United States Patent [19]
Wallace

[11] 3,851,182
[45] Nov. 26, 1974

[54] BIAS TRANSFORMER FOR DUAL VOLTAGE INPUT OFF-LINE CONVERTERS

[75] Inventor: Kenneth Andrew Wallace, Columbus, Ohio

[73] Assignee: North Electric Company, Galion, Ohio

[22] Filed: Sept. 4, 1973

[21] Appl. No.: 394,254

[52] U.S. Cl. .................................. 307/23, 321/15
[51] Int. Cl. ........................................ H02j, H02m
[58] Field of Search .......... 321/8 R, 15, 47; 307/11, 307/23, 8 S

[56] References Cited
UNITED STATES PATENTS

| | | | |
|---|---|---|---|
| 3,654,539 | 4/1972 | Schnur | 321/8 R |
| 3,713,018 | 1/1973 | Tscheuschner | 321/15 |
| 3,733,541 | 5/1973 | Elms | 321/15 |

Primary Examiner—William H. Beha, Jr.
Attorney, Agent, or Firm—Johnson, Dienner, Emrich, Verbeck & Wagner

[57] ABSTRACT

In a dual voltage input AC to DC converter, the main DC voltage output is generated by a dual mode rectifier circuit, and an auxiliary AC voltage output is generated by a bias transformer circuit connected to the dual mode rectifier circuit. Though the AC to DC converter is capable of operating from dual input line voltages, both the main DC output voltage and the auxiliary AC output voltage remain constant and are independent of which one of the line voltages is input to the circuit.

15 Claims, 3 Drawing Figures

BIAS TRANSFORMER FOR DUAL VOLTAGE INPUT OFF-LINE CONVERTERS

BACKGROUND OF THE INVENTION

1. Field of the Invention

This invention relates to off-line high frequency power supplies, specifically the AC to DC converter thereof.

2. Description of the Prior Art

With the development in recent years of better DC to DC converter components, a need has arisen for off-line high frequency power supplies capable of accepting dual input. This is especially true in the field of low volume or small size off-line computer power supplies.

In such a high frequency power supply an AC to DC converter converts the 60 cycle line frequency to a high voltage DC, which in turn is converted to low voltage DC by a DC to DC converter. This double step conversion has the advantage of greater efficiency than would be derived from converting AC line voltage directly to low voltage DC.

Often the power supply must be designed for two increments of line voltage sources which are related by a factor of two, for example: 110 and 220 volts, or 115 and 230 volts (AC rms). This means that the AC or DC converter must be capable of receiving either the high or low voltage source but in either case it must deliver to the DC to DC converter a single output voltage. This is further complicated when an auxiliary AC bias circuit must also be connected from the AC to DC converter to the DC to DC converter, which bias circuit output must also be at a single voltage level.

A common form of AC to DC converter is a dual mode rectifier circuit. Such a circuit uses no transformers in the AC to DC conversion yet it can operate either as a full wave bridge rectifier, delivering an output DC voltage which is approximately equal to the peak input voltage when connected to the higher signal source; or it can operate as a full wave voltage doubler delivering an output DC voltage approximately equal to twice the peak input voltage when connected to the lower signal source. In either case, the main output DC voltage of the converter is the same, a DC voltage approximately equal to the peak value of the higher voltage input.

As mentioned above, besides generating a high voltage DC output, it is often a requirement that the AC to DC converter provide separate low voltage AC bias to the DC to DC converter. This isolated low voltage AC bias is converted to a DC bias and is used to control the internal operation of the DC to DC converter, and thereby control the main power output. Where the main output of the AC to DC converter could be in the range of 300 volts, the bias power would only be 10, 12, 15 or 25 volts. To generate this low voltage, a transformer is commonly used to step the voltage down to the required level. The current that flows through the primary of this step down transformer is quite low when compared to the main DC power current that is flowing to the DC to DC converter. Thus the AC to DC converter provides both a high voltage DC signal and a low voltage AC signal, which signals are eventually used in the DC to DC converter, which in turn provides the final useful end output that is delivered to the load.

Since the step down transformer used in the bias circuit must operate on an AC signal, the most convenient place to connect the transformer to the dual mode rectifier circuit is across the AC source. However, since the dual mode rectifier is designed to accomodate dual inputs, the transformer must be similarly designed, since the bias input to the DC to DC converter must be kept at the same level regardless of which source value is at the input.

To accomplish this dual mode of operation many schemes are available. The most common schemes employ the practice of using the full primary winding of a center tapes transformer for operation at the higher line voltage and half the primary, as made possible by the center tap, for operation at the lower line voltage. When operating at the higher line voltage, a large transformer with a large number of turns in its primary is needed, which transformer thus requires more wire resulting in a greater expense. However, when operating at the lower line voltage, this excess winding, while adding nothing to the circuit, detracts from the overall advantage, in terms of size, cost, and efficiency, for which the basic design of the AC to DC converter was chosen.

Instead of a center tapped primary winding, other schemes for generating the AC bias power exist but they have their drawback also. A series parallel winding could be used, but for a low power transformer this is an even more complicated scheme. A dropping resistor could be used, but this is very lousy, would require connection changes, additional switches, etc. It would even be possible to generate the bias voltage directly from the high voltage DC but this would be most inefficient.

SUMMARY OF THE INVENTION

A novel feature of the present invention has one side of the primary winding of a simple bias transformer connected to one side of the AC signal source, while the other side of the winding is connected to the midpoint of the series connected capacitor filter of the DC output of the dual mode rectifier circuit.

It is an object of the present invention to reduce the cost of prior art off-line power supplies by altering the interconnection of the bias circuit within the AC to DC converter, thereby reducing in complexity and size the transformer used in said bias circuit.

DESCRIPTION OF THE PREFERRED EMBODYMENT

Figure 1:
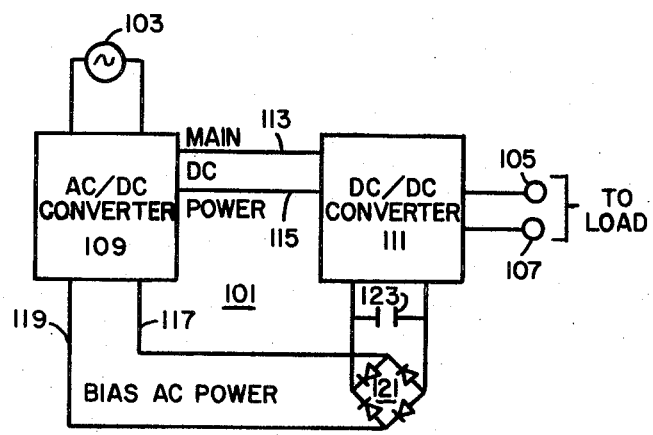
FIG. 1 is a block diagram of a typical off-line high frequency power supply.

FIG. 1 shows an off-line high frequency power supply 101 connected between a source of AC power 103 and a load (not shown) connected across terminals 105 and 107. The power supply 101 contains an AC to DC converter 109 and a DC to DC converter 111. As shown, the converter 109 delivers to the converter 111, two types of power: a main DC power, delivered over conductors 113 and 115, and a bias AC power, delivered over conductors 117 and 119. The bias AC power, to be used by the DC to DC converter is first rectified by a rectifier bridge circuit 121 and filtered by capacitor 123.

The DC to DC converter 111 is a common item well known to those skilled in the art; as for example the DC to DC converter described in U.S. Pat. No. 3,526,823 issued on Sept. 1, 1970 to L. L. Genuit and assigned to General Electric Co. The AC to DC converter 109, though also standard in the prior art will be described in detail, reference being made to FIG. 2.

Figure 2:
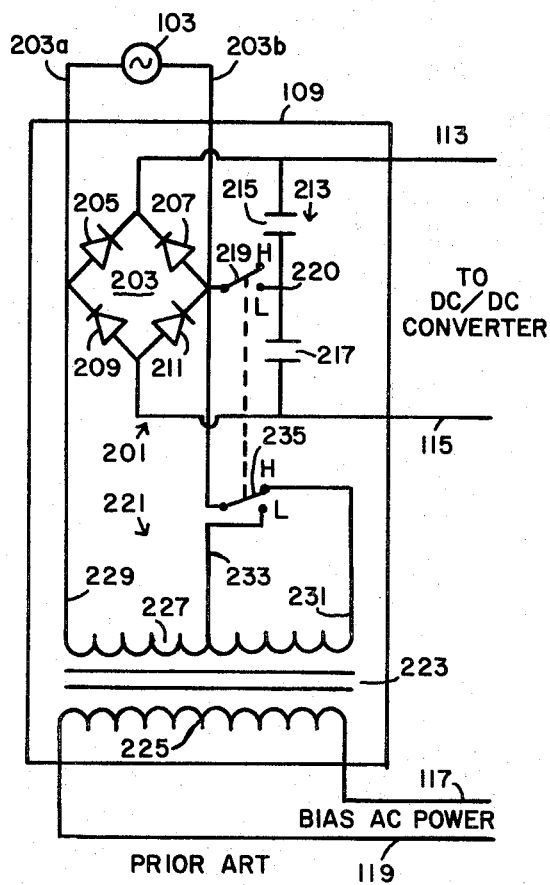
FIG. 2 is an example of the configuration of the prior art AC to DC converter used in the power supply shown in FIG. 1.

As shown in FIG. 2, and described above, the prior art configuration of the AC to DC converter 109 consists of a dual mode rectifier circuit 201. This dual mode rectifier circuit 201 contains: a rectifier bridge circuit 203, consisting of four diodes 205, 207, 209, and 211 in a bridge configuration; a capacitor filter 213, containing two equal size series connected capacitors 215 and 217; and a switch 219. The source of AC power 103 is connected across the input of the bridge circuit 203 by leads 203a and 203b, and the filter 213 is connected across the DC output. The switch 219, which permits the dual mode operation of circuit 201 is connected from the input side of the rectifier bridge 203 to the mid-point 220 of the series connected capacitor filter 213. The DC power output is taken across the capacitor filter 213 on leads 113 and 115.

The switch 219 is a basic requirement for operation of the rectifier circuit 201 in dual modes. With the switch open for a high voltage input, the rectifier bridge circuit 203 operates as a full wave bridge rectifier and the DC voltage drop across the capacitor filter 213 on leads 113 and 115, the DC output to the DC to DC converter, is approximately equal to the peak voltage output of the AC source 103. The DC voltage drop across each capacitor 215 and 217 is therefore approximately equal to half the peak voltage of the AC source 103, and the DC polarity across each capacitor remains constant.

When the switch is closed for a low voltage input, the rectifier circuit 203 operates as a full wave doubler circuit. Only diodes 205 and 209 operate in this circuit, diode 205 operating with capacitor 215 during one half of the input cycle, diode 209 operating with capacitor 217 during the other half of the input cycle. Since the closed switch 219 ties the mid-point 220 and one side of the capacitors directly to one side of the source 103, while the other side of the capacitors is tied through the diodes to the other side of the source, the voltage drop across each capacitor approximately equals the peak voltage of the AC source 103.

Since the low voltage AC source is equal to half the value of the high voltage AC source, the voltage drop across each capacitor at the low voltage input is the same as when the switch 219 is open for the high voltage input. Thus the voltage drop and the polarity across the capacitor filter 213, the DC output on leads 113 and 115, remains the same for both the high voltage input and the low voltage input.

The voltage across each capacitor 215 and 217, besides being the same for two different inputs, also remains fairly constant during a single cycle of the AC input, storing energy during the peaks of the cycle and delivering it during the valleys. Thus it can be seen that the dual mode rectifier circuit provides a nearly constant output, independent of the input variances.

Besides the rectifier circuit 201 providing the main DC power to the DC to DC converter on leads 113 and 115, the AC to DC converter 109 also contains an AC bias circuit 221 which delivers an AC bias signal to the DC to DC converter over leads 117 and 119. The bias circuit consists of a step down transformer 223, the secondary winding 225 thereof being connected to the DC to DC converter over leads 117 and 119. Because it is most convenient to connect the primary winding 227 across the AC source 103, the primary winding 227 of the transformer is designed with primary leads 229, 231 to operate at the higher line voltage, and a center tap 233 is provided for operation at the lower line voltage. As pointed out before, this means that a large primary winding with its attended cost is needed to accommodate the higher line voltage, which large primary winding is not needed at the lower line voltage. In addition, a switch 235 is needed to switch between the primary lead 231 and the center tap 233, which switch 235 would operate in conjunction with switch 219. To avoid this expense, necessary with the prior art of FIG. 2, the novel feature shown in FIG. 3 was conceived.

Figure 3:
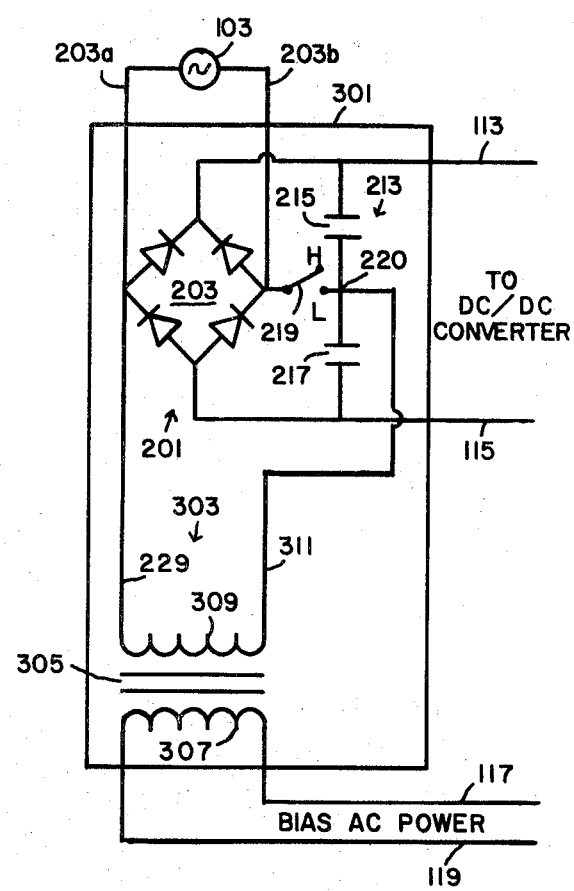
FIG. 3 is an example of the configuration of a novel AC to DC converter to be used in the power supply shown in FIG. 1.

The novel AC to DC converter 301, shown in FIG. 3, contains a dual mode rectifier circuit 201 with the same components found in the prior art. A rectifier bridge circuit 203 has its input connected across an AC power source 103, by leads 203a and 203b, and its output connected across a capacitor filter 213. Leads 113 and 115 deliver DC power to a DC to DC converter. The capacitor filter 213 has two series connected capacitors 215 and 217, and a switch 219 connects the mid-point 220 to the input side of the rectifier bridge 203. Operation of this dual mode rectifier circuit 201 is the same as in the prior art.

AC to DC converter 301 is distinguished over the prior art converter 109 in the configuration of the AC bias circuit 303, both in its components and in its connection to the dual mode rectifier circuit 201. As in the prior art, the AC bias circuit 303 makes use of a step down transformer 305, the secondary winding 307 thereof being connected to the DC to DC converter over leads 117 and 119. In addition, primary lead 229 connects one side of primary winding 309 to one side of the AC source 103. The second primary lead 311, however, connects the other side of the primary winding 309 to the mid-point 220 of capacitor filter 213. This connection, not found in the prior art, places the primary winding 309 across the individual capacitor 215 or 217 when the diodes are conducting, since a diode, when conducting, is essentially tying two points together. As the voltage drop across the capacitors remain constant, approximately equal to the peak voltage at the lower source voltage, the primary winding 309 of the step down transformer 305 need only be designed for the lower of the two source voltages. Thus the novel connection illustrated in FIG. 3 dispenses with the large step down transformer, with its added cost, needed in the prior art, and it also dispenses with the center tap and the mechanism needed to switch between the center tap and the primary lead.

An important point should be emphasized at this time. The novel concept illustrated by the configuration shown in FIG. 3 is not simply the changing of the primary lead of the transformer from the line side of the switch 219 to the capacitor side thereof; it is the fact that the new AC to DC converter is now able to use a different trasnformer in its AC bias circuit. In the prior art configuration, the bias transformer 223 was directly across the line. As such it had to handle the full voltage at the higher increment. In the novel circuit the bias transformer 305 is alternately connected through a diode across one of the capacitors 213 and 215. Though the transformers in both the prior art configuration and the novel configuration have to handle the same power, the transformer in the prior art circuit has to accommodate twice the voltage as the transformer in the new circuit. Thus, the transformer in the prior art has to be designed for the higher voltage and be tapped for the lower voltage, resulting in a more expensive and complex operation. Eliminating the center tap and the switching mechanism reduces the cost and complexity; but more important in cost reduction is the reduction by half of the number of turns in the transformer of the novel circuit as compared to the transformer of the prior art. Thus, the present device illustrates a low level AC bias power source with less complexity and less cost than shown in the prior art. This novel AC bias circuit takes advantage of a dual mode rectifier circuit configuration known in the prior art, but heretofore not used, to enable the use of a less complex bias transformer that can be designed for one source voltage, the lower source voltage. No switching mechanism dedicated to the transformer is needed. What switching is done, is done by the circuit itself. As the polarities on the two capacitors remains the same, and as one primary lead of the transformer is connected to the midpoint between the capacitors, the other side of the transformer, connected to the AC source, is switched back and forth between the opposite sides of the filter, continually reversing the polarity of the transformer. Thus the present circuit, by connecting the transformer in a novel configuration, delivers the same performance as the prior art but in a less complex and more economical way.

I claim:

1. Circuit means containing means for connecting said circuit means to a source of AC input voltage of a first value and alternatively of a second value, said circuit means containing first means for providing a single level DC output voltage in response to input voltage of said first and alternatively said second value and second means for providing a single level AC output voltage in response to input voltage of said first and alternatively said second value, said second means comprising a transformer the entire primary winding of which is connected by said first means directly to said source of first value and alternatively indirectly through said first means to said source of second value.

2. Converter means containing first circuit means for providing a single level DC output voltage and second circuit means for providing a single level AC output voltage; said first circuit means including a rectifier bridge circuit means containing means for connecting said converter means to a source of AC input voltage of a first value and alternatively of a second value, a switch means having a first position and alternatively second position for connecting said rectifier bridge circuit to an output means; said second circuit means comprising a transformer the entire primary winding of which is connected by said switch in its first position to said source of AC input voltage of first value and by said switch in its second position to said source of second value via the midpoint of said output means.

3. A converter means as claimed in claim 2 wherein said entire primary winding of said transformer is connected to said first circuit means when said switch means is in said first position.

4. A converter means as claimed in claim 2 wherein said entire primary winding of said transformer is connected across said source of AC input voltage when said switch means is in said second alternative position.

5. A converter means as claimed in claim 4 wherein said switch means connects said mid-point of said output means to said means for connection of said rectifier bridge circuit means to said source of AC input voltage source.

6. A converter means as claimed in claim 2 wherein said source of AC input voltage of said first value is twice the value of said alternatively second AC input voltage.

7. A converter means as claimed in claim 2 wherein said first circuit means operates as a full wave bridge rectifier circuit when said switch means is in said first position.

8. A converter means as claimed in claim 2 wherein said output means is a series connected capacitor filter means and wherein said first circuit means operates as a full wave voltage doubler circuit when said switch means is in said alternatively second position.

9. A converter means containing means for connecting said converter means to a source of AC input voltage of a first value and alternatively of a second value, said converter means containing first circuit means for providing a single level DC output voltage in response to input voltage of said first and alternatively said second value and second circuit means for providing a single level AC output voltage in response to input voltage of said first and alternatively said second value, said first circuit means including a series connected capacitor filter means, said second circuit means comprising a transformer the entire primary winding of which is connected between a first connecting means for connecting one side of said primary winding to said input voltage source and a second connecting means for connecting the other side of said primary winding to the mid-point of said series connected capacitor filter means.

10. A converter means as claimed in claim 9 wherein said first circuit means includes a rectifier bridge circuit means connected to said means for connecting said converter means to said source of AC input voltage, a switch means having a first position and alternatively second position, said alternatively second position connecting said mid-point of said series connected capacitor filter means to said means for connecting said converter means to said source of AC input voltage.

11. A converter means as claimed in claim 10 wherein said first circuit means operates as a full wave bridge rectifier circuit when said switch means is in said first position.

12. A converter means as claimed in claim 10 wherein said first circuit means operates as a full wave voltage doubler circuit when said switch means is in said alternatively second position.

13. A converter means containing a first and second circuit means, said first circuit means containing a first and second connecting means for connecting said converter means to a source of AC input voltage of a first value and alternatively of a second value, said first circuit means including a switch means connecting an output means to said first connecting means, said second circuit means comprising a transformer the entire primary winding of which is connected between a third and fourth connecting means, said third connecting means connecting one side of said primary winding to said second connecting means included in said first circuit means, said fourth connecting means connecting the other side of said primary winding to said output means included in said first circuit means, said transformer means receiving the full voltage input to said first and second connecting means when said switch means is in a first position, said transformer means receiving from said first circuit means one half the voltage input to said first and second connecting means when said switch is in an alternatively second position, the output of said transformer being a single level AC voltage.

14. A converter means containing a first means for connecting said converter means to a source of AC input voltage of a first value and alternatively of a second value and a second means for connection to a load, said second means containing a first and second circuit means, said first circuit means delivering DC power to said load in response to input voltage of said first and alternatively said second value, said second circuit means delivering AC bias power to said load in response to input voltage of said first and alternatively said second value, said first circuit means including a rectifier bridge circuit means, a switch means, and a series capacitor filter means, said second circuit means comprising a transformer the entire primary winding of which is connected between a first and second connecting means, said first connecting means connecting one side of said primary winding to one input side of said rectifier bridge circuit means and through said first means to one side of said source of AC input voltage, said first means connecting the other side of said source of AC input voltage to the other input side of said rectifier bridge circuit means, said switch means connecting said other input side of said rectifier bridge circuit means to the mid-point of said series capacitor filter means, the output of said rectifier bridge circuit means delivering said DC power to said load being across said series capacitor filter means, said second connecting means connecting the other side of said primary winding to said mid-point of said series capacitor filter means, said switch means operating in a first position so as to enable said first circuit means to provide a DC output of twice the voltage as is delivered by said first circuit means when said switch means is in an alternatively second position, said primary winding receiving over said first and second connector means the same AC voltage during both positions of said switch means.

15. A converter means as claimed in claim 14 wherein said first input voltage is twice the value of said alternatively second input voltage.

* * * * *